US006970981B2

(12) United States Patent
Kanaley (10) Patent No.: US 6,970,981 B2
(45) Date of Patent: Nov. 29, 2005

(54) METHOD AND APPARATUS TO MAINTAIN CONSISTENCY BETWEEN AN OBJECT STORE AND A PLURALITY OF CACHES UTILIZING TRANSACTIONAL UPDATES TO DATA CACHES

(75) Inventor: Michael John Kanaley, San Francisco, CA (US)

(73) Assignee: TIBCO Software, Inc., Palo Alto, CA (US)

( * ) Notice: Subject to any disclaimer, the term of this patent is extended or adjusted under 35 U.S.C. 154(b) by 505 days.

(21) Appl. No.: 10/305,759

(22) Filed: Nov. 27, 2002

(65) Prior Publication Data

US 2003/0120873 A1 Jun. 26, 2003

Related U.S. Application Data

(60) Provisional application No. 60/343,272, filed on Dec. 21, 2001.

(51) Int. Cl.[7] .............................................. G06F 12/00
(52) U.S. Cl. ....................................... 711/141; 711/152
(58) Field of Search ................................. 711/141, 152

(56) References Cited

U.S. PATENT DOCUMENTS

| 5,734,898 | A  | 3/1998 | He              |
| 6,209,003 | B1 | 3/2001 | Mattis et al.   |
| 6,256,712 | B1 | 7/2001 | Challenger et al. |

OTHER PUBLICATIONS

Haobo Yu and Lee Breslau, "A Scalable Web Cache Consistancy Architecture", International Computer Science Institute, Berkely, CA, 12 pgs.
Chengjie Liu and Pei Cao, "Maintaining Strong Cache Consistancy in the World-Wide Web", Department of Computer Science, University of Wisconsin-Madison, Madison, WI, 10 pgs.
Andrew S. Tanenbaum and Maarten van Steen, "Distributed Systems: Principles and Paradigms", pp. 330-333 and 648-667, http://www.cs.vu.nl/~ast/books/ds1/.
TIBCO Software Launches E-Business Portal Builder, Industry Embraces TIBCO's B2B Portal Platform: A Real-time Window to the Business World, http://www1.tibco.com/about/press/releases/press154.html, 5 pgs.
Danny Ayers, et al., "Professional Java Server Programming", Create n-tier Java applications with servlets and JSP Featuring XML, EJBs, JDBC, JNDI, JavaMail, RMI, CORBA, Jini/JavaSpaces and Apache, Published by Wrox Press Ltd, Arden House, 1102 Warwick Road, Acock's Green, Birmingham B27 6BH, UK, Printed in USA, ISBN 1-861004-65-6 Chapter 23 "Enterprise JavaBeans", pp. 156-618.
Christopher, Thomas W., "High-Performance Java Platform Computing: Multithreaded and Networked Programming", 1/e ISBN 0-13-016164-0, Chapter 3 "Race Conditions and Mutual Exclusion", pp. 43-88.
Christopher, Thomas W., "High-Performance Java Platform Computing: Multithreaded and Networked Programming", 1/e ISBN 0-13-016164-0, Chapter 4 "Monitors", pp. 89-122.

*Primary Examiner*—Jack Lane
(74) *Attorney, Agent, or Firm*—Blakely Sokoloff Taylor & Zafman LLP (57) ABSTRACT

A method and system to maintain cached objects. The method includes locking a plurality of caches to prevent subsequent write operations to the plurality of caches upon notification of an update operation to a plurality of objects in an object store. The plurality of caches is updated as a common transaction. The locking may include identifying each of the plurality of caches as having registered an interest that is affected by the update operation, and identifying further caches associated with the object store as not having registered an interest that is affected by the update operation.

46 Claims, 12 Drawing Sheets

| Identifier | Key | Value |
|---|---|---|
| Notifiable Caches Map 301 | Cache 1 | Embedded Objects Map — 303 |
|  | • | • |
|  | • | • |
|  | Cache n | Embedded Objects Map — 303 |
| Embedded Objects Map 303 | Object 1 | Operation 1 |
|  | • | • |
|  | • | • |
|  | Object n | Operation n |
| Cached Objects Map 305 | Object 1 | Cache 1 (if exists) |
|  | • | • |
|  | • | • |
|  | Object n | Cache n (if exists) |
| Interested Objects Map 307 | Object 1 | (ignored) |
|  | • |  |
|  | • |  |
|  | Object n |  |
| Monitors Map 309 | Monitor 1 | (ignored) |
|  | • |  |
|  | • |  |
|  | Monitor n |  |

METHOD AND APPARATUS TO MAINTAIN CONSISTENCY BETWEEN AN OBJECT STORE AND A PLURALITY OF CACHES UTILIZING TRANSACTIONAL UPDATES TO DATA CACHES

The present application claims the benefit for the filing date of U.S. provisional patent application Ser. No. 60/343,272, filed Dec. 21, 2001.

FIELD OF THE INVENTION

The present invention relates generally to the field of object-oriented programming and, more specifically to a method and apparatus to maintain consistency between an object store and a plurality of caches.

BACKGROUND OF THE INVENTION

Within object-oriented programs, objects utilized by an application are often stored in a so-called "object store" (or object repository). For example, an object-oriented database is a flexible database that supports the use of abstract data types, objects, and classes and that can store a wide range of data, often including sound, video, and graphics, in addition to text and numbers. The primary structure of such an object-oriented database is sometimes referred to as an object store. Some object-oriented databases allow data retrieval procedures and rules for processing data to be stored along with the data or in place of the data. This allows the data to be stored in areas other than in the physical database, which is often desirable when the data files are large, such as those for video files.

In order to enhance the performance of an object-oriented program, a number of in-memory caches may be implemented in which frequently accessed objects may be stored so as to facilitate high-speed access to such objects. It will be appreciated that updates to objects maintained within an object store need to be propagated to caches where cached copies of such objects are instantiated so as to maintain consistency between the object store and in-memory caches.

A known LDAP object store only allows updating of one object at a time. Other existing solutions do not perform well to maintain cache consistency in a scalable manner. The performance of iterating over objects of the same type is slow because lists of objects must be cloned to avoid concurrent modification exceptions.

SUMMARY OF THE INVENTION

In an exemplary, a computer-implemented method maintains cache consistency. The method includes, upon notification of an update operation to an object store, locking a plurality of caches to prevent subsequent write operations to the plurality of caches. The updating of the plurality of caches is performed as a common transaction.

The locking, in an exemplary embodiment, includes identifying each of the plurality of caches as having registered an interest that is affected by the update operation, and identifying further caches associated with the object store as not having registered an interest that is affected by the update operation.

The identifying may include identifying at least one of the plurality of caches as having registered an interest in an object type that is the subject of the update operation to the object store.

The identifying may include identifying at least one of the plurality of caches as having registered an interest in a specific object that is a subject of the update operation to the object store.

The plurality of caches may, in an exemplary embodiment, be concurrently locked upon notification of the update operation to the object store.

An interest may optionally be registered by each of the plurality of caches in at least one object within the object store. The interest of at least one cache of the plurality of caches may be registered in an object type.

The interest of the at least one cache may be registered utilizing an object identifier associated with the specific object.

The common transaction, in one exemplary embodiment, includes a plurality of write operations to objects contained within the plurality of caches, wherein the plurality of write operations are to be treated as a single atomic event Each of the caches of the plurality of caches may have a respective monitor associated therewith.

Each of the monitors may be a multiple-reader, single writer monitor that facilitates multiple concurrent read operations to the associated cache and that facilitates a single write operation of the associated cache at any one time.

Responsive to the notification of the update operation to the object store, the method may dynamically generate a map identifying each of the plurality of caches as having registered an interest that is affected by the update operation, the map further identifying objects in each of the plurality of caches of that are affected by the update operation.

A notification thread may be instantiated responsive to the notification of the update operation, the notification thread operating to lock the plurality of caches to prevent the subsequent write operations to the plurality of caches.

The plurality of caches may include a children cache distinct from a parent cache. The plurality of caches may include a references cache distinct from a cache being referenced. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus to maintain consistency between an object store and a plurality of caches are described. In the following description, for purposes of explanation, numerous specific details are set forth in order to provide a thorough understanding of the present invention. It will be evident, however, to one skilled in the art that the present invention may be practiced without these specific details.

An exemplary embodiment of the present invention seeks to provide transactional notification of in-memory caches of objects of an object store, and to provide increased performance in the access of such in-memory caches, especially as the number of objects in the cache grows large. In an exemplary embodiment, when a cache is created (e.g., a copy of an object is instantiated in memory for quicker access), the cache includes not only a copy of the object but also information regarding which updates to the object store necessitate an update to the cache, i.e. the cache registers interest in objects. The interest in objects may be registered for either a specific object by unique ID or for all instances of a type of object. In an exemplary embodiment, all objects are guaranteed to have a unique ID different from other objects in the same repository. A cache is identified as having registered an interest in the update to the object store if it has registered an interest in one or more objects affected by the update. It is to be appreciated that an update to an object store may include adding one or more objects, removing one or more objects or modifying one or more objects.

In order to ensure that only one thread is updating the caches at any one time, all caches that are identified as having registered an interest in the update are locked prior to updating the caches. In the exemplary embodiment, in-memory caches each have a monitor associated therewith to allow locking. In general, each cache has its own monitor but objects could be configured to share the same monitor for multiple caches.

When objects are added to, changed within or removed from the object store, an update notification is issued. Notification specifies which objects are subject of the update to the object store. A notification thread is instantiated and iterates over in-memory caches, identifies caches interested in the update to the object store, and write locks the caches so identified. The write lock operates to block any thread from performing new reads or new writes on the cache. After all outstanding reads are completed, the notification thread is guaranteed to have exclusive access to the cache until it releases the write lock.

In an exemplary embodiment caches can also specify that they are interested only in a subset of the objects in the update to the object store and can thus return the old cached versions of the objects unaffected by the update to the object store.

Once all the caches interested in objects specified in the update notification have been locked, the caches are updated in a transactional fashion. Each updated object may have its transient state copied from the cached version. Once the update to caches is completed the caches are unlocked.

In an exemplary embodiment, only one notification thread is implemented. However multiple threads could be used to pipeline update notifications if the caches updated in each transaction are disjoint. A persistent object framework (POF) may be optimized to run in a multi-threaded, per-user oriented environment.

In an exemplary embodiment the POF is optimized for iterating over cache elements. Regardless of whether a single or multiple caches are used, children or references of an object are stored as IDs. If only one cache keyed by ID is utilized for both the object and its references or children, the one cache should be accessed once for each reference or child, each time going through a synchronized block of code. The number of synchronized blocks of code increases linearly as the number of children or references increases. Using multiple caches as in the POF, the references or children of an object are stored in a separate cache. In order to iterate over a cache, a thread needs to start reading, iterate, and then stop reading. Only the start reading and stop reading portions of the code are synchronized, therefore a synchronized block of code is encountered twice regardless of the number of children or references associated with the object.

The exemplary embodiment of the invention discussed below is implemented as a caching runtime object model framework. The framework operates to maintain near real-time updated caches of a large number of objects. The foundation of POF may be Java. Further details regarding an exemplary embodiment of the present invention will now be discussed.

Figure 1:
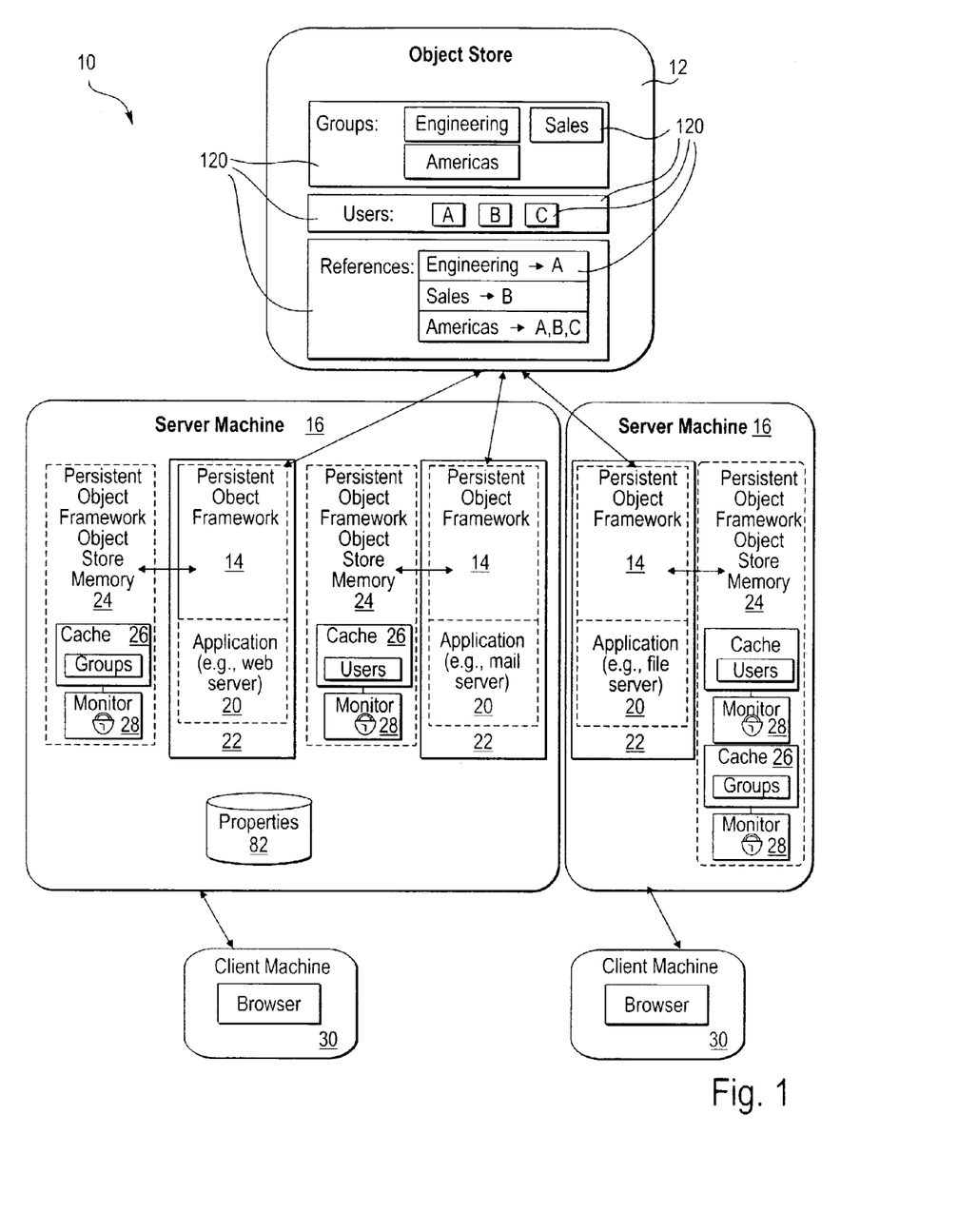
FIG. 1 is a diagrammatic representation of a system according to an exemplary embodiment of the present invention, to maintain consistency between an object store and a plurality of in-memory object caches.

FIG. 1 is a diagrammatic representation of a system 10, according to an exemplary embodiment of the present invention, to maintain consistency between an object store 12 and a plurality of in-memory object caches 26. Specifically, FIG. 1 illustrates an object store 12 that is coupled by network connections to at least one machine 16 running a framework 14 in the exemplary form of a persistent object framework (POF) 14. The connection to the object store 12 may be specified in a file 82 containing connection properties information.

The POF 14 allows objects 120 to be implemented once and stored in the object store 12. An object is a data item with instructions for one or more operations to be performed on it. Objects may have relationships between each other (e.g., parent and child) and together they form an object model. An object model defines how objects are represented, what are the attributes associated with each object, and how objects and attributes can be manipulated. An object model allows programs to persist configuration information and data so that the program can be run unattended. In the following description the term "entity" shall be taken to include but not be limited to the term "object".

A collection of POFs 14 operates to distribute the object store 12 to many processes across a network. A virtual object store may be created by processes that use the POFs 14. In an exemplary embodiment, a POF 14 is designed to be embedded in a server application 20. A POF 14 and a server application 20 may run as a single process 22. The server application 20 may require high throughput, which can be achieved by efficiently caching objects 120. Each process 22 maintains cached objects 26. As an application 20 (e.g., a web server, a mail server or a file server) requests data in the form of objects 120 from the object store 12, the objects 120 are instantiated in memory 24 in the form of in-memory caches 26. Each cache 26 has a monitor 28 associated with it. The monitor 28 is used to coordinate access to shared data in the cache 26 by the client machines 30. When objects are added, changed or removed from the object store 12, an update notification is received by all the server applications 20 using POFs 14.

In an exemplary embodiment, when objects 120 of the object store 12 are updated by users accessing the client machine 30 via the process 22, the caches affected by the update are updated accordingly by the POF 14.

Figure 2:
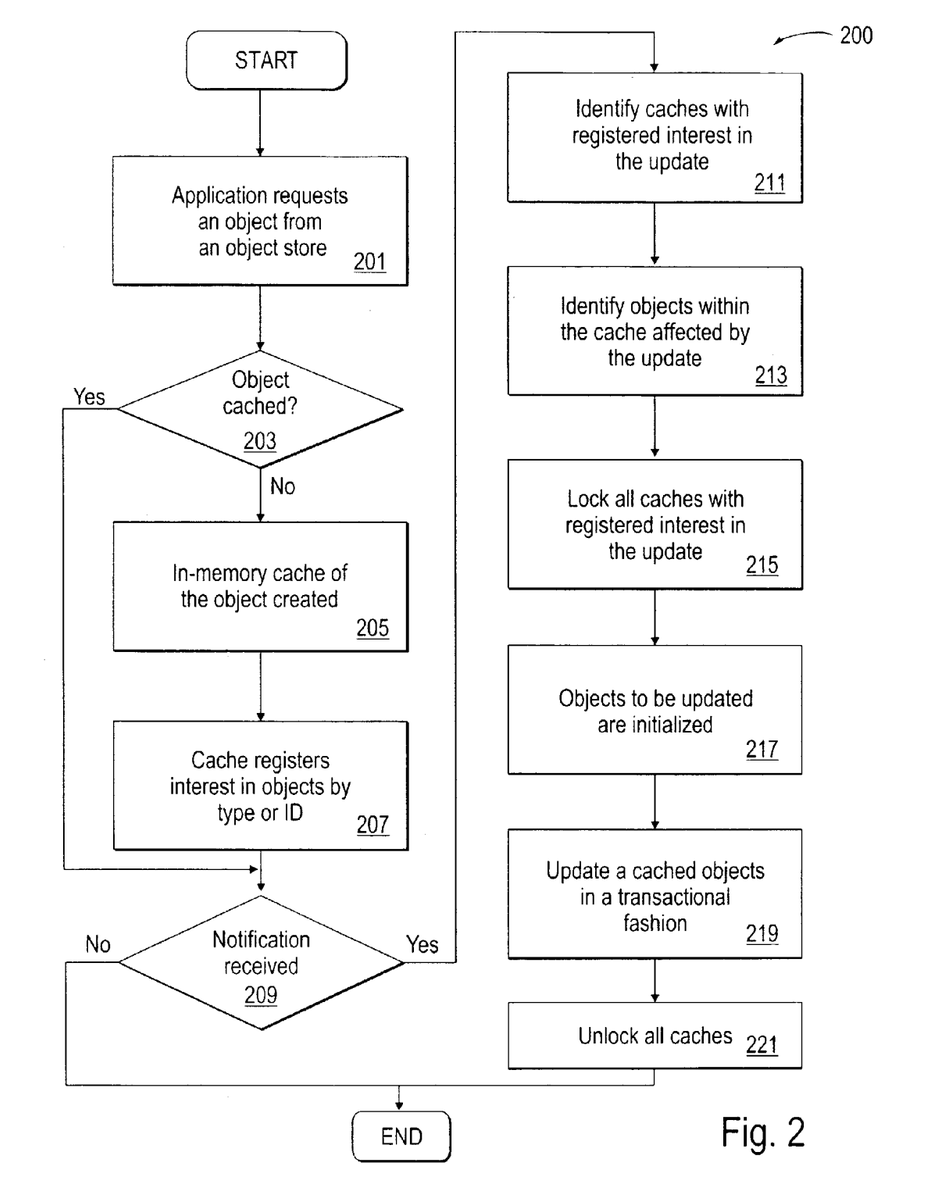
FIG. 2 is a flowchart illustrating a method performed to maintain consistency between an object store and cached objects, according to an exemplary embodiment.

FIG. 2 is a flowchart illustrating a method 200, according to an exemplary embodiment of the present invention, of updating objects. The method 200 commences when an application 20 requests an object from an object store 12 at operation 201. At operation 203, a determination is made whether the requested object has already been cached. If not, then at operation 205, the POF 14 creates an in-memory cache of the object. At operation 207, the newly created cache registers an interest in objects by either an object type or an object ID. If the requested object already exists, the method 200 progresses to operation 209, where it is determined whether a notification is received.

According to an exemplary embodiment of the present invention, two methods for receiving notifications of an update operation to an object store 12 are provided: polling for notifications and real time notifications. Polling for notifications is where a POF 14 polls an object store 12 for changes. In an exemplary embodiment, this can be efficiently done by having a single transaction "table" that gets updated at the end of every transaction with the IDs and class names of objects within the object store 12 that have been modified, been added, or been removed (cumulatively referred to as "having been updated"). The polling thread retrieves the updated objects from this table. Alternatively, an entire updated object may be stored in the transaction table.

Some object stores support real-time notification of changes so polling is not needed. Accordingly, in a further embodiment, each framework 14 has a thread with a dedicated connection to an object store 12 that will receive updates in near real-time.

When the POF 14 receives an update notification, it iterates over all the caches that it maintains and identifies caches with registered interest in the update to the object store at operation 211. At operation 213, the POF 14 further identifies objects within each of the interested caches, which are affected by the update to the object store 12 and thus need to be updated. At operation 215, a notification thread is initiated and locks all caches identified as having registered an interest in the update. Once all the caches interested in objects specified in the update notification have been locked, the caches are notified of the changes or updates that have been performed to the object store 12. The objects to be added/updated/removed are initialized at operation 217. Transient attributes are copied from the cached entities. Then all caches are updated at operation 219 and the write locks are released. Applications 20 (FIG. 1) can register their own notification handlers that get called after the write locks are released at operation 221.

There may be a separate operation calling application-registered listeners, allowing applications to watch for changes to an object model shipped by another application. Application listeners may be called after the caches are unlocked so that the application has a consistent view of the caches.

Figure 4:
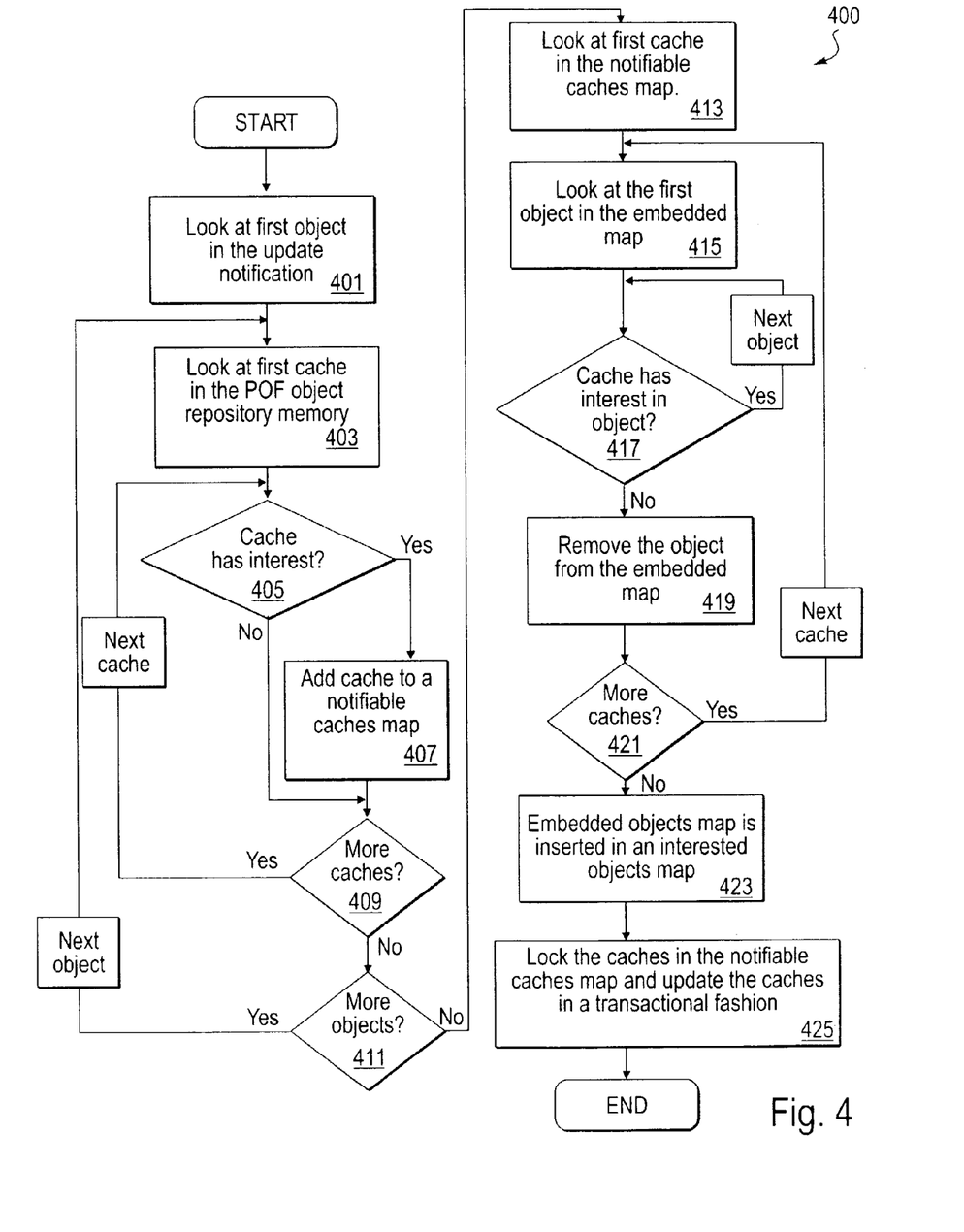
FIG. 4 is diagrammatic representation of structures created responsive to an update to the object store.

FIG. 4 illustrates exemplary structures that may be created when an update to an object store 12 is committed. A key of a notifiable caches map 401 is a notifiable cache that potentially has an interest in the update to the object store; the value is an embedded map of objects to operations 403 that apply to the notifiable cache. A key of the embedded objects map 403 is an object, which is the subject of the update; the value is an operation performed on the object. A key of a cached objects map 405 is an object being notified; value is a cached object if there is one. A key of an interested objects map 407 is an object being notified; value is ignored. A key of a monitors map 409 is a reader writer monitor; value is ignored.

Figure 3:
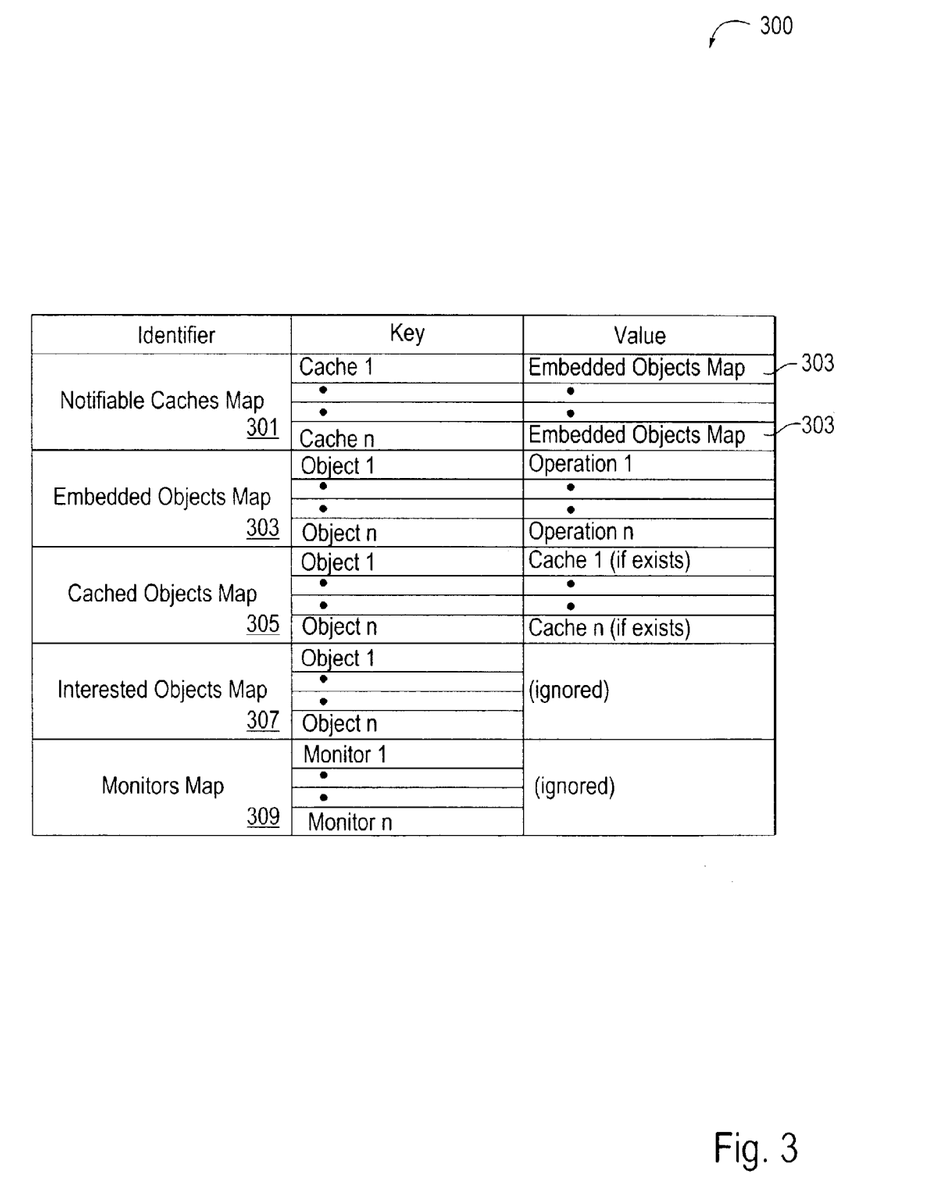
FIG. 3 is a block diagram illustrating the operations performed to identify caches interested in the update to an object store, according to an exemplary embodiment.

FIG. 3 is a flowchart illustrating a method 300, according to an exemplary embodiment of the present invention, including operations performed by a POF 14 to identify caches that need to be updated as a result of the update operation to an object store 12. The first operation is to iterate over all the added, modified, and removed objects in the notification and identify POF caches that could potentially have interest in them (either by ID or an object type). Operations 301 through 312 illustrate iteration over all the added, modified, and removed objects in the update notification. For each object in the update notification, the POF 14 iterates over the POF caches at operations 303 through 310. At operation 305, the POF 14 determines whether a cache has a potential interest in an object. Responsive to a positive determination at operation 305, the cache, which is the subject of the determination, is added to a notifiable caches map. The object is added to an embedded objects map (not shown). The embedded objects map is associated with all caches in the notifiable caches map. Responsive to a negative determination at operation 311 (i.e., when all the objects in the update notification have been presented to the POF caches), the caches in the notifiable caches map is iterated over at operations 313 through 322. Each cache in the notifiable caches map is presented with each object from an embedded objects map associated with that cache at operations 315 through 318. Responsive to a negative determination at operation 321 (i.e., all caches in the notifiable caches map have been iterated over), the caches in the keys of the notifiable caches map are iterated over, and each cache is presented with the embedded objects map of objects it could be interested in. Each cache updates the embedded objects map by removing objects that it is not interested in at operation 319. The embedded objects map is then inserted in an interested objects map (407 of FIG. 4) at operation 323. Thus, in the exemplary embodiment, cached objects are updated by updating the underlying data structure rather than replacing it, making the update more efficient since a single cache may contain a large number of members. At operation 325, the caches in the notifiable caches map are locked and updated by the POF 14 in a transactional fashion.

Figure 5:
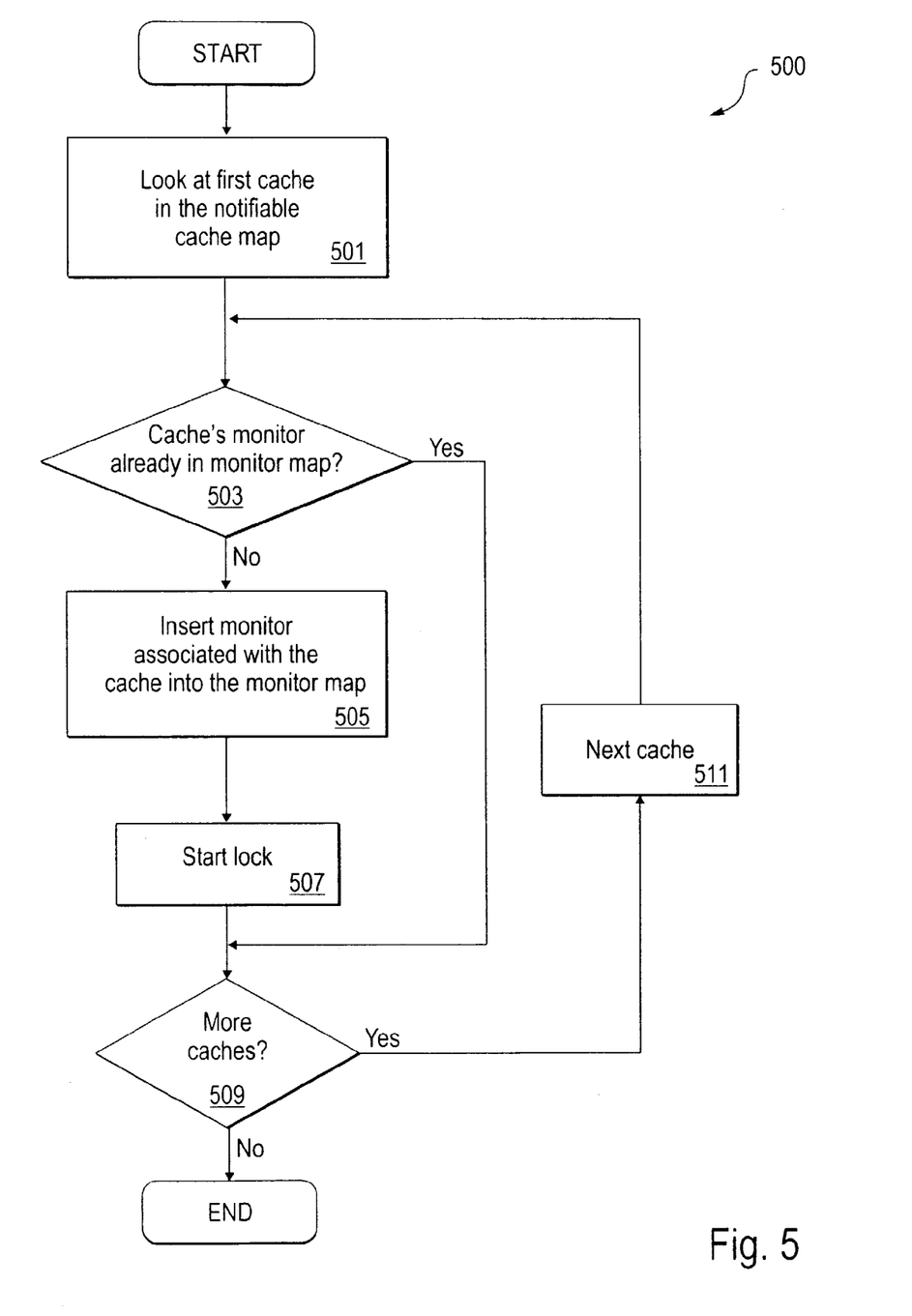
FIG. 5 is a block diagram illustrating the operations performed for locking in memory caches according to an exemplary embodiment of the present invention.

FIG. 5 is a flowchart illustrating method 500, according to an exemplary embodiment of the present invention, to lock caches in a notifiable caches map prior to an update to caches. In the exemplary embodiment, all the caches in the keys of the notifiable caches map are iterated over, starting with a first cache at operation 501 and proceeding through each cache through operation 511. A POF 14 determines if a monitor associated with a cache is already present in a monitors map 409 at operation 503. If the monitor is not present, the monitor for the cache is inserted into the monitors map at operation 505, and a write lock is started on the cache at operation 507. The iteration is completed responsive to a negative determination at block 509. By the time the iteration is completed, all outstanding reads on the caches have terminated and any new reads will block.

Figure 6:
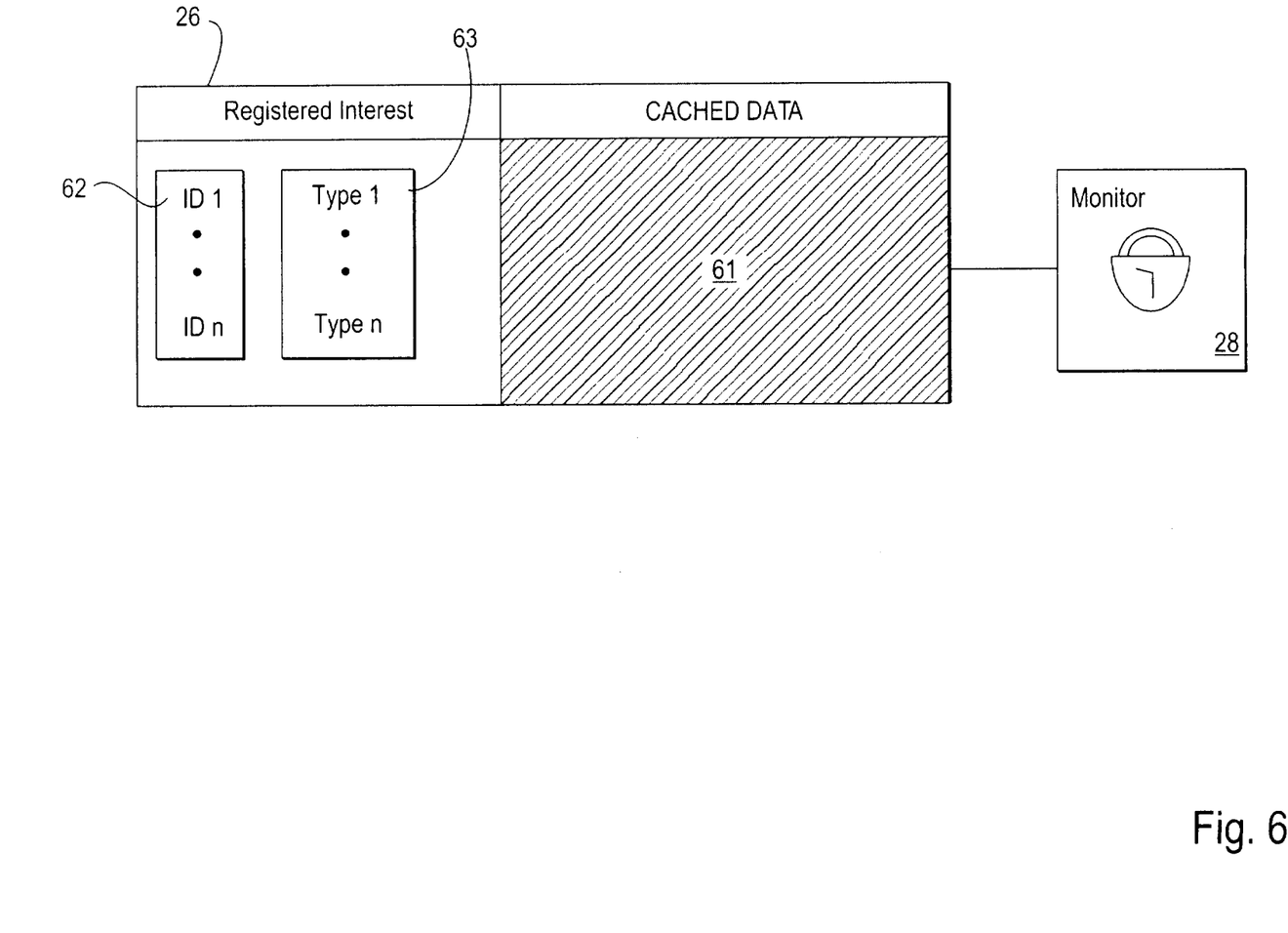
FIG. 6 is a diagrammatic representation of an in-memory cache according to an exemplary embodiment of the present invention.

FIG. 6 is a diagrammatic representation of an exemplary cache 26 and monitor 28 associated with the cache 26. The cache 26 includes cached data 61 in the exemplary form of objects; and information 65 regarding what objects in an object store 12 the cache 26 is interested in. When a cache 26 is created, it registers interest in objects either by ID 62 or type of object 63. By default, caches 26 are only interested in objects if:

a) the cache is interested in the specific object by a unique ID; OR
b) the cache has already loaded the entity into memory; OR
c) the object was updated by the same process; OR
d) an application has requested to iterate all objects in the cache since the process has started.

Regarding b), for example, suppose that an object A was used by an application 20 and cached in memory. If that object is updated in the object store 12, the POF 14 receives a notification and it is useful to have the cache 26 register interest in the modified/removed object so it can update its cache 26 to reflect the current state of the object. Regarding c), if the same process creates/updates/removes an object, then the caches in that process are interested in seeing the current state of the object. Regarding d), if a process requests all the objects of a given type, and later another process creates/modifies/removes an object of the same type, the current process expresses interest in the new object because it is likely that the application 20 will request all the objects of the given type again, and it is much more efficient to retrieve objects from cache instead of the object store. Applications 20 can override this default behavior.

Figure 7:
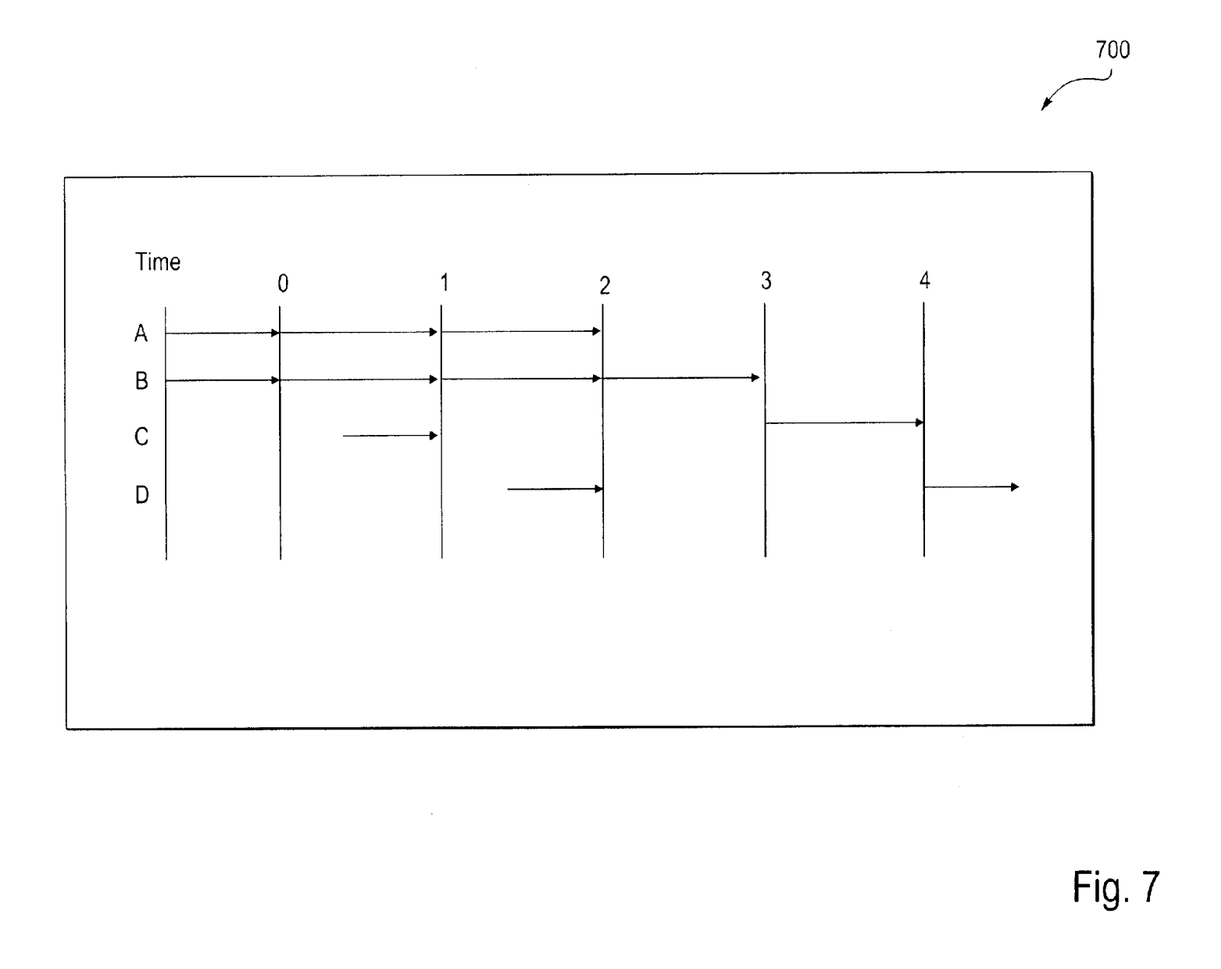
FIG. 7 illustrates how a monitor works for a single cache according to an exemplary embodiment of the present invention.

FIG. 7 is a timing diagram illustrating an exemplary method 700 by which the monitor works for a single cache 26. Assume threads A and B are already reading from the cache 26, and are iterating over all the elements in the cache 26. Thread C is the thread that received the notification and wants to lock the cache 26. Thread D is another reading thread that tries to use the cache 26 after the write has begun.

At time T=0 threads A and B are executing.

At time T=1 thread C decides it must update the cache 26 and sets a writer lock. Because there are outstanding readers, thread C blocks.

At time T=2 thread D tries to read and thread A finishes reading. Note that thread D blocks because there is an outstanding writer.

At time T=3 thread B finishes reading. The writer thread will start.

At time T=4 the writer thread finishes and any blocked readers will start.

Examples of Operation

Figure 8:
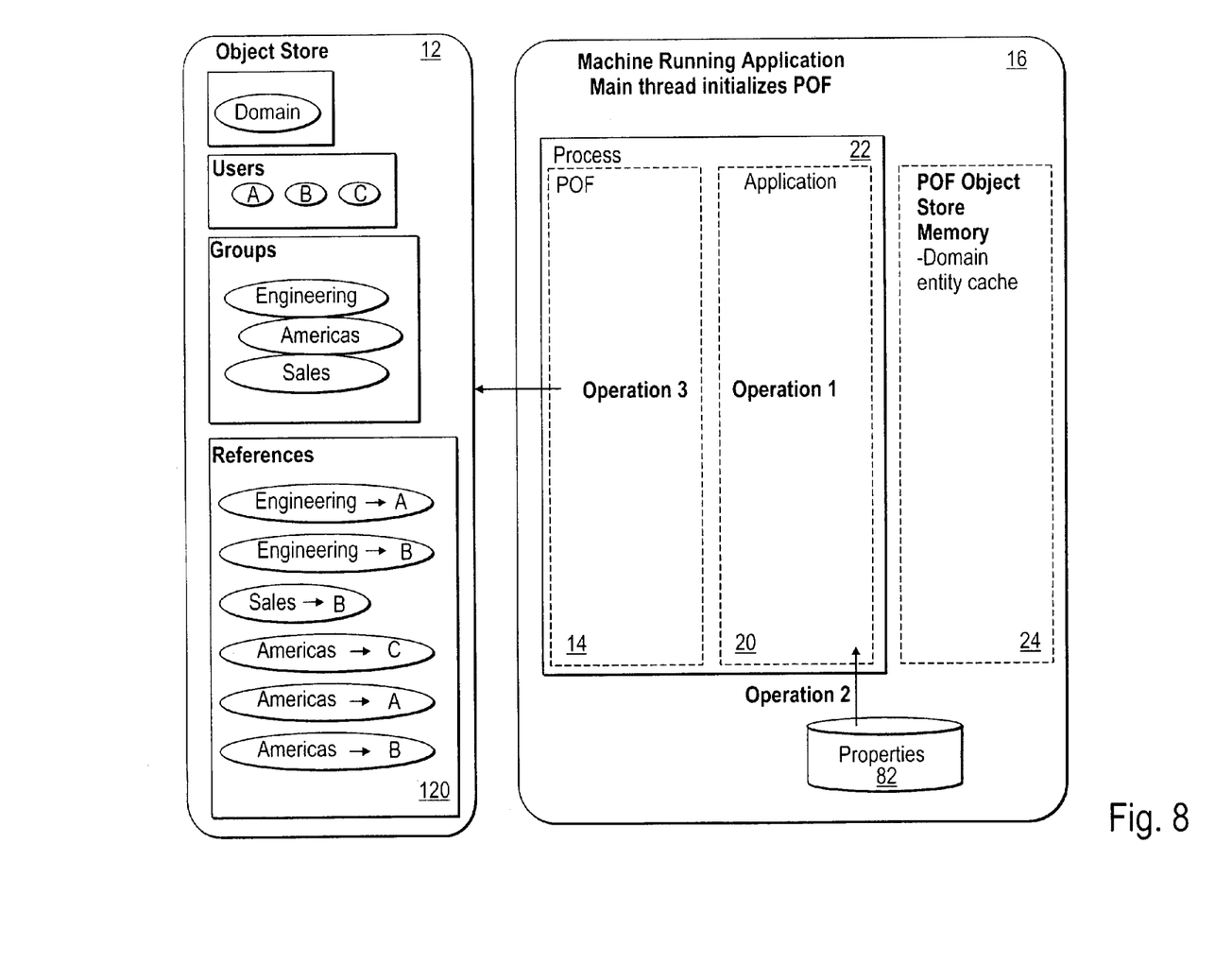
FIGS. 8–10 provide diagrammatic representations, according to an exemplary embodiment of the present invention, of creating multiple caches responsive to application requests, caches registering interest in objects, and performing an update to an object store in a transactional fashion.
Figure 9:
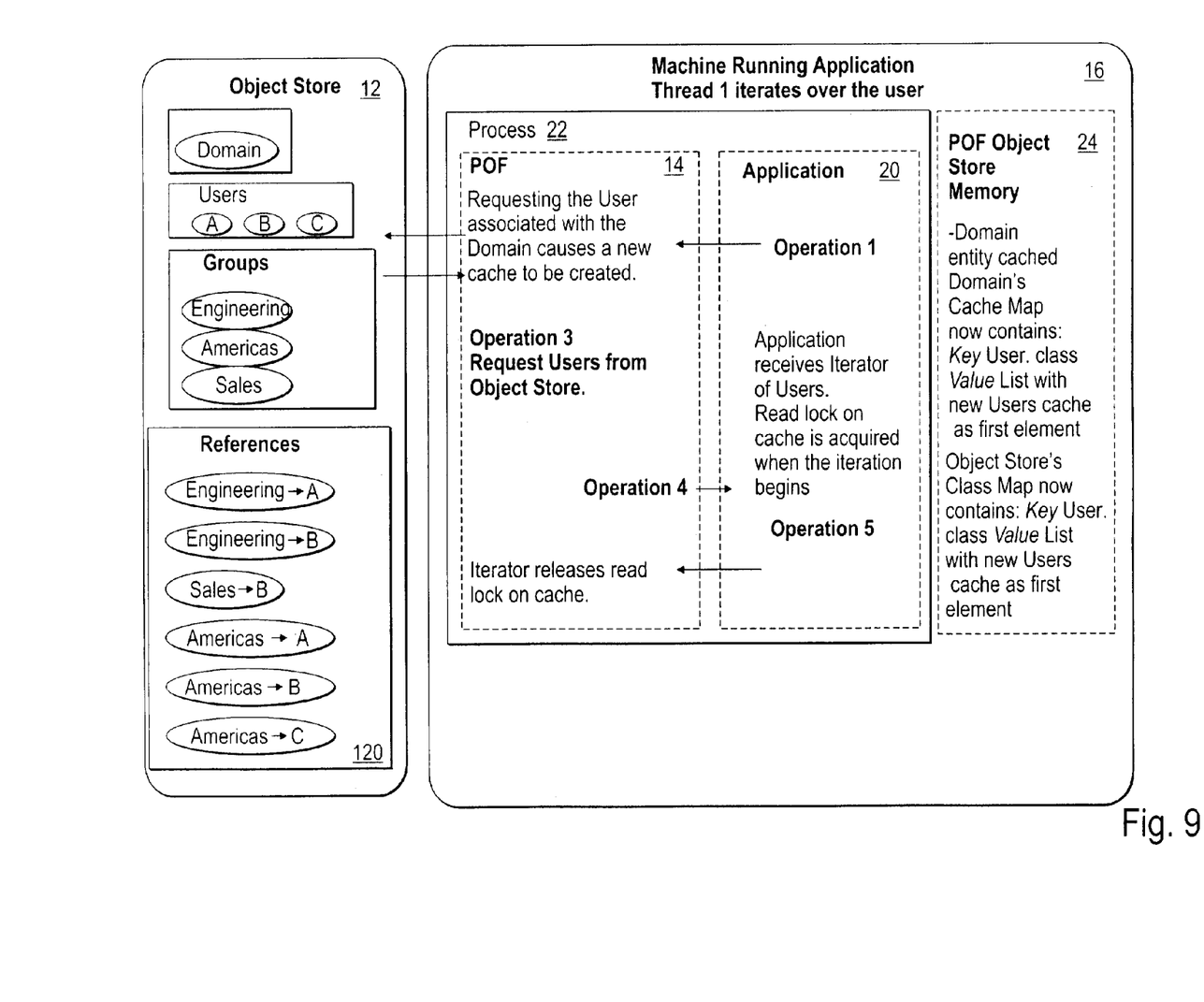
Figure 10:
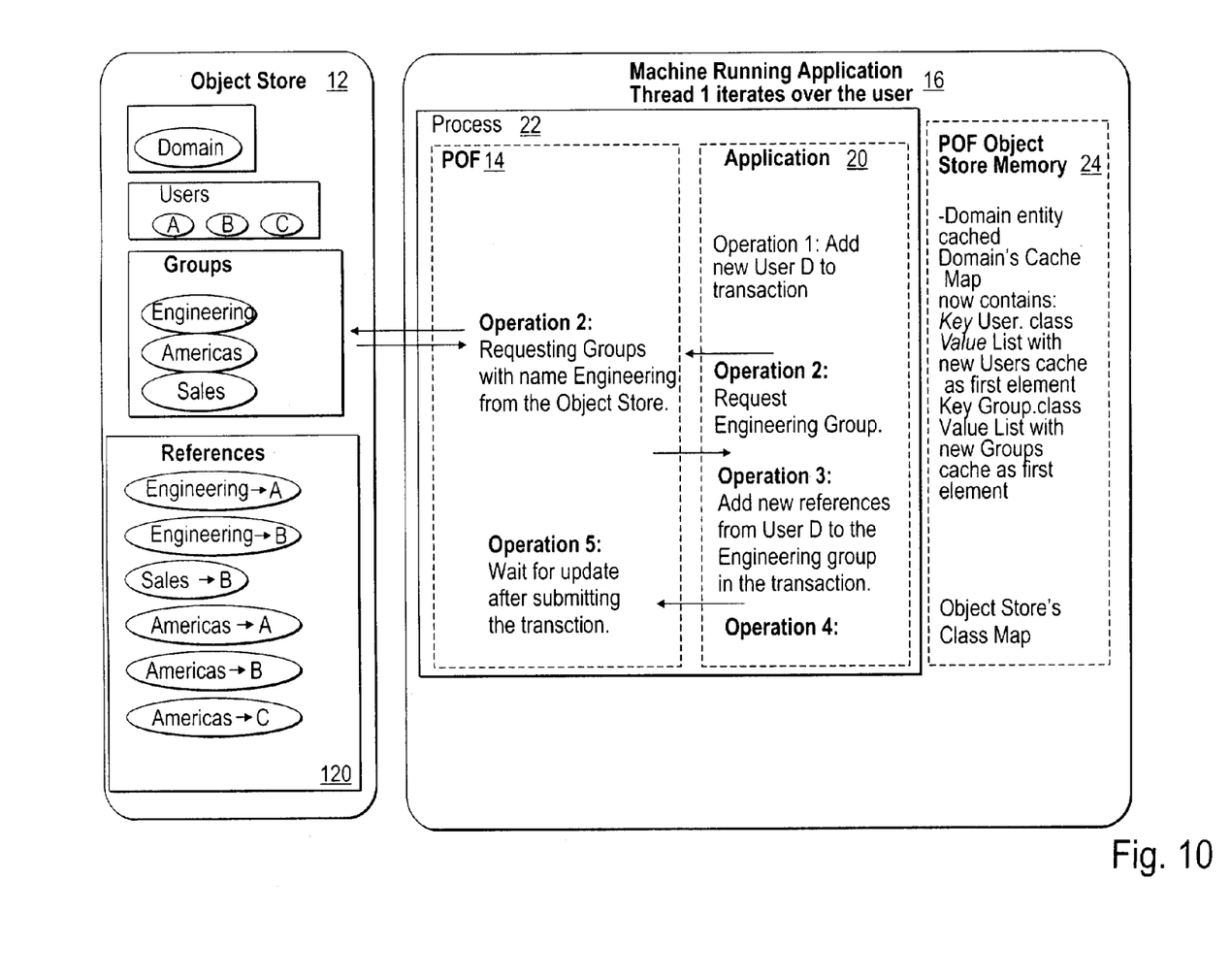

An exemplary embodiment of the method described above to maintain consistency between an object store 12 and a plurality of caches is provided with reference to FIGS. 8–10. The figures illustrate loading of caches on demand and storing references in a separate cache to increase performance.

FIG. 8 is a diagrammatic representation of the following operations performed at T=0 as a main thread initializes POF 14:

Operation 1: Application 20 is started;
Operation 2: The application 20 has hard coded the domain of objects in an object store 12 it is interested in. In this case, an application servlet is interested in the domain of objects that stores users and groups. Each domain has a corresponding properties file 82 to describe how to connect to the object store 12 so objects can be loaded from that domain later;
Operation 3: Using the properties file 82, the POF 14 initializes pools of connections to an object store 12. The POF 14 caches the domain object.

FIG. 9 is a diagrammatic representation of the following operations (performed at T=2) as a thread iterates over users;

Operation 1: Requests all the Users in the cached Domain. A new cache is created from the domain object to hold objects of type User;
Operation 2: The newly created cache registers interest in User objects;
Operation 3: The POF 14 requests the Users from the object store 12 and creates an in-memory cache to hold objects of type User;
Operation 4: The POF 14 initiates iteration over objects in the object store, the iterator is returned to the application. When the iterator is first used, a read lock is acquired on the cache;
Operation 5: After the iterator has completed iterating over all the Users or is finalized, the read lock is released.

FIG. 10 is a diagrammatic representation of the following operations (performed at T=1) as a thread iterates over users:

Operation 1: Acquire a new transaction object for the object store. Add a new User with name D to the transaction;
Operation 2: Get the group named Engineering from the POF 14;
Operation 3: Add a new Reference from Engineering to the new User D in the transaction;
Operation 4: Commit the transaction to update the Object Store;
Operation 5: Wait for notification of the update to be received by the notification thread in POF before returning control back to the user. Further exemplary embodiments of the method and apparatus described above are provided with reference to FIG. 11 as utilizing a simplified workflow application. Assume that a workflow application is being built. Each workflow contains a set of tasks to perform. Some tasks might contact users so these tasks refer to a stylesheet—transforming data in the task with the stylesheet, which creates a message to be sent to a user.

Figure 11:
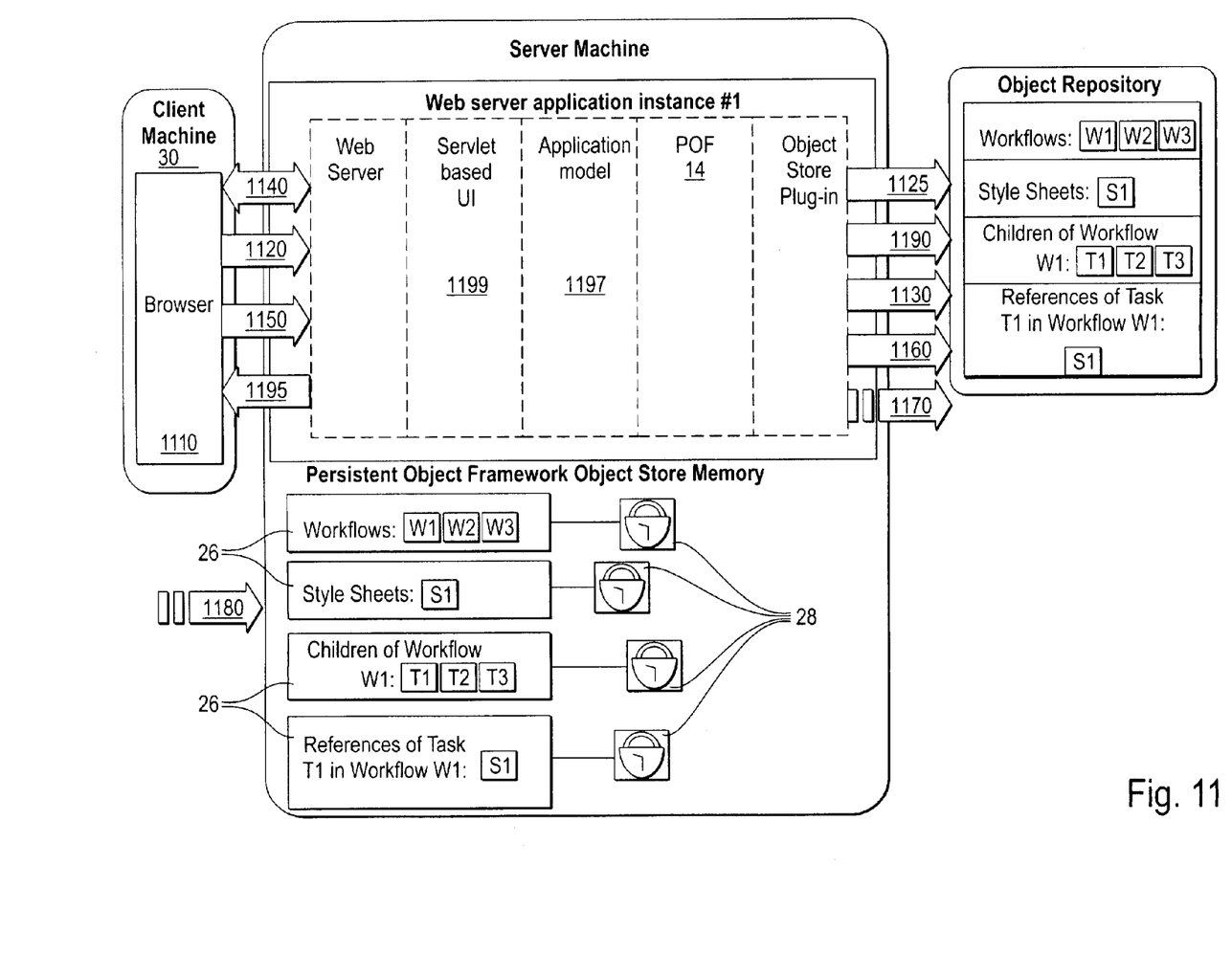
FIG. 11 provide diagrammatic representations, according to an exemplary embodiment of the present invention, of transactionally updating caches responsive to an update operation to the object store utilizing a workflow example.

Consider a system with workflows W1, W2, W3 and style sheets S1, S2 that can be used by the Tasks in the workflow. Assume workflow W1 has tasks T1, T2, T3 and task T1 refers to a style sheet called S1. Assume all the objects have been loaded into memory; the following is a list of all the caches:

WL—the list of workflows: W1, W2, W3. This cache registers interest for entities of type workflow with parent <none>.

SL—the list of style sheets: S1. This cache registers interest for entities of type style sheet with parent <none>.

W1C—the children of workflow W1: T1, T2, T3. This cache registers interest for entities of type workflow with parent W1.

T1R—the references of task T1 in workflow W1: S1. This cache registers interest for specific entities by ID—only S1 in this case.

Notice that there is a separate cache 26 for the children of W1, as well as a separate cache 26 for the reference of T1. Children and references are stored separately from the parents and the objects being referenced in order to optimize iterating over cache elements and to avoid operating system contention (e.g., when more than one process is competing for the same resource).

If the children of W1 are stored in the same cache 26 as W1 itself, then to iterate over the children of object W1, access to one cache 26 is required for each child. To iterate over the children of workflow W1, access would be required to the one cache 26 three times (for T1, T2 and T3). This would result in going through a synchronized block of code three times. As the number of children or references increases, the number of synchronized blocks of code increases linearly.

In the example in FIG. 11, the children of W1 are stored in a single cache 26. To iterate over the cache 26, there is a need to start reading, iterate, and then stop reading. Only the start reading and stop reading are synchronized so the method proceeds through a synchronized block of code two times—as the number of children or references increase, the number of synchronized blocks is constant—always two.

Assume that an administrator using the browser has been navigating through a servlet based UI 1199 displaying workflows. The administrator has viewed all the workflows and style sheets so they are all cached in memory. The application model 1197 contains classes for workflows, tasks and style sheets, which have extended a base object class that provides interfaces to access the caches stored as transient fields in the instances of these classes. The caches WL, SL, W1C, and T1R are all being maintained automatically by the POF 14.

The administrator decides to update W1 and its dependent task T1 (operation 1120). The first operation is locking the workflow W1 and task T1 for update to prevent other administrators from changing them. It is up to the application model 1197 to determine which objects are locked. The lock itself, in one exemplary embodiment, is an object managed by the POF 14 in a transaction. The POF 14 requests lock for W1 and T1 (operation 1125). Once a lock is committed to the object store 12, another lock cannot be created for the object.

Now that the lock has been established, the latest version of W1 and T1 are retrieved from the object store 12 (operation 1130). This copy is what is modified (operation 1140). A user decides to commit W1 and T1 (operation 1150). All updated objects are committed to the object store 12 (operation 1160). If the object store 12 is a database and a transaction spans tables then a lock for update (row level lock) can be done first to block any queries being made on those tables.

After the commit succeeds the committing process sends a message informing the other processes of the commit to all instances of the POF 14 on the network (operation 1170). At this point the browser is still waiting for a response to the commit.

In this example, as shown in FIG. 11, all instances of a Web server application using the POF 14 receive a notification (operation 1180). The notification includes a graphic user identification (GUID) for the transaction, the changed objects in the transaction and the operations on them (in this example, the new W1 and the new T1).

In this example, a messaging tool is utilized, which guarantees that messages will arrive within an interval, in order, to all POF enabled processes that have been started. Usually the message will be processed in real-time. If this is the instance that committed this transaction by comparing GUIDs, then the objects from the transaction are updated in the caches. If this instance is not the one that committed the operation, then this process determines if it is interested in any of the entities in the notification and gets a list of monitors to lock. In this example, the list includes the monitors 28 associated with WL and W1C.

The POF 14 transactionally updates the caches 26 in this process with the changed objects. First, the monitors 28 for caches W1C and WL have a write lock established. Once all write locks are established, all reads that were being executed are finished and all new reads are blocked. Then, the caches W1C and WL are updated (operation 1190). The caches store objects in maps keyed by ID but the actual cache implementation may vary. Then the write locks on all the monitors 28 are released.

The integrity of all the caches 26 is guaranteed for this process. The process that performed the commit sends a successful response (operation 1195) back to a browser 1110. The user knows that the transaction has completed and that other machines are being updated.

Figure 12:
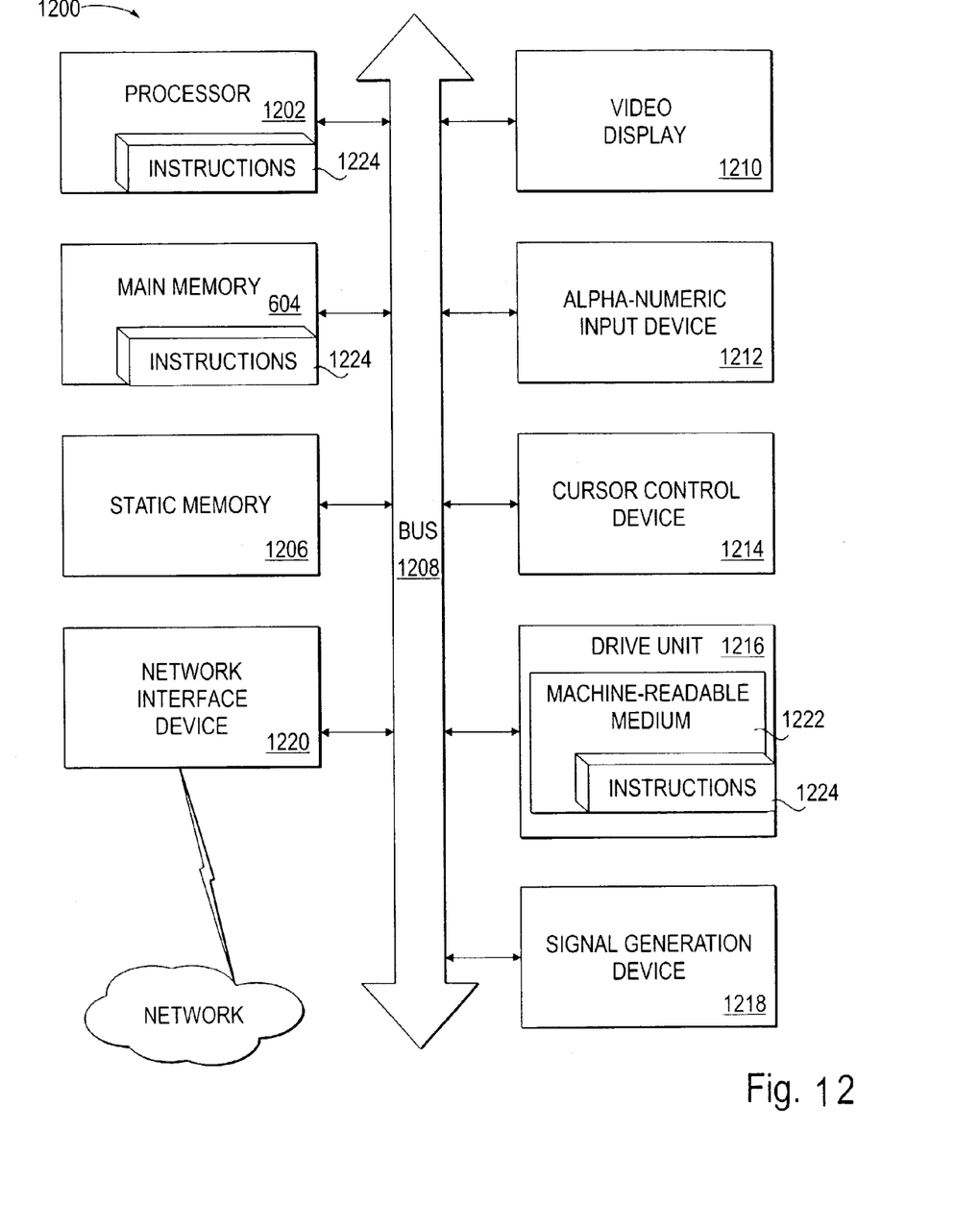
FIG. 12 shows a diagrammatic representation of a machine in the exemplary form of a computer system within which a set of instructions for causing the machine to perform any one of the methodologies discussed above may be executed.

FIG. 12 shows a diagrammatic representation of machine in the exemplary form of a computer system 1200 within which a set of instructions, for causing the machine to perform any one of the methodologies discussed above, may be executed. In alternative embodiments, the machine may comprise a network router, a network switch, a network bridge, a set-top box (STB), Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored a set of instructions (i.e., software) 1224 embodying any one, or all, of the methodologies or functions described herein. The software 1224 is also shown to reside, completely or at least partially, within the main memory 1204 and/or within the processor 1202. The software 1224 may further be transmitted or received via the network interface device 1220. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to included, but not be limited to, solid-state memories, optical and magnetic disks.

Thus, a method and apparatus to maintain consistency between an object store and a plurality of caches have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method to maintain cache consistency, the method including:

upon notification of an update operation to a plurality of objects in an object store, locking a plurality of caches to prevent subsequent write operations to the plurality of caches; and updating the plurality of caches as a common transaction.

2. The method of claim 1 wherein the locking includes identifying each of the plurality of caches as having registered an interest that is affected by the update operation, and identifying further caches associated with the object store as not having registered an interest that is affected by the update operation.

3. The method of claim 2 wherein the identifying includes identifying at least one of the plurality of caches as having a registered an interest in an object type that is the subject of the update operation to the object store.

4. The method of claim 2 wherein the identifying includes identifying at least one of the plurality of caches as having registered an interest in a specific object that is a subject of the update operation to the object store.

5. The method of claim 1 including concurrently locking the plurality of caches upon notification of the update operation to the object store.

6. The method of claim 1 including registering an interest by each of the plurality of caches in at least one object stored within the object store.

7. The method of claim 6 wherein the interest of at least one cache of the plurality of caches is registered in an object type.

8. The method of claim 6 wherein the interest of at least one cache of the plurality of caches is registered in a specific object.

9. The method of claim 8 wherein the interest of the at least one cache is registered utilizing an object identifier associated with the specific object.

10. The method of claim 1 wherein the common transaction includes a plurality of write operations to objects contained within the plurality of caches, wherein the plurality of write operations are to be performed as a single atomic event.

11. The method of claim 1 wherein each of the caches of the plurality of caches has a respective monitor associated therewith, each of the monitors being to coordinate access to shared data.

12. The method of claim 11 wherein each of the monitors is a multiple-reader, single writer monitor that facilitates multiple concurrent read operations to the associated cache and that facilitates a single write operation of the associated cache at any one time.

13. The method of claim 1 including, responsive to the notification of the update operation to the object store, dynamically generating a map identifying each of the plurality of caches as having registered an interest that is affected by the update operation, the map further identifying objects in each of the plurality of caches of that are affected by the update operation.

14. The method of claim 1 including instantiating a notification thread responsive to the notification of the update operation, the notification thread operating to lock the plurality of caches to prevent the subsequent write operations.

15. The method of claim 1 wherein the plurality of caches includes a children cache distinct from a parent cache.

16. The method of claim 1 wherein the plurality of caches includes a references cache distinct from a cache of an object being referenced.

17. A system to maintain cached objects, the system including:

a locking mechanism to allow locking a plurality of caches upon notification of an update operation to a plurality of objects in an object store to prevent subsequent write operations; and an update mechanism to update the plurality of caches as a common transaction.

18. The system of claim 17 wherein the locking mechanism allows the locking by identifying each of the plurality of caches as having registered an interest that is affected by the update operation, and by identifying further caches associated with the object store as not having registered an interest that is affected by the update operation.

19. The system of claim 18 wherein the identifying is to allow identifying at least one of the plurality of caches as having registered an interest in an object type that is the subject of the update operation to the object store.

20. The system of claim 18 wherein the identifying is to allow identifying at least one of the plurality of caches as having registered an interest in a specific object that is the subject of the update operation to the object store.

21. The system of claim 18 including a registering mechanism to allow registering an interest by each of the plurality of caches in at least one object stored within the object store.

22. The system of claim 21 wherein the interest of at least one cache of the plurality of caches is registered in an object type.

23. The system of claim 21 wherein the interest of at least one cache of the plurality of caches is registered in a specific object.

24. The system of claim 23 wherein the interest of the at least one cache is registered utilizing an object identifier associated with the specific object.

25. The system of claim 17 wherein the locking mechanism is to allow concurrently locking the plurality of caches upon notification of the update operation to the object store.

26. The system of claim 17 wherein the common transaction includes a plurality of write operations to objects within the plurality of caches, wherein the plurality of write operations are to be treated as a single atomic event.

27. The system of claim 17 wherein each of the caches of the plurality of caches has a respective monitor associated therewith, each of the monitors being to coordinate access to shared data.

28. The system of claim 27 wherein each of the monitors is a multiple-reader, single writer monitor that facilitates multiple concurrent read operations to the associated cache and that facilitates a single write operation of the associated cache at any one time.

29. The system of claim 17 including, an identification mechanism to dynamically generate a map upon notification of the update operation to the object store, identifying each of the plurality of caches as having registered an interest that is affected by the update operation, the map further identifying objects in each of the plurality of caches that are affected by the update operation.

30. The system of claim 17 including a notification mechanism to instantiate a notification thread responsive to the notification of the update operation, the notification thread operating to lock the plurality of caches to prevent the subsequent write operations.

31. The system of claim 17 including a monitoring mechanism to allow a plurality of applications to watch for changes to an object model created by another application.

32. A computer system to maintain cache consistency, the computer system comprising:
a memory;
one or more processors coupled to the memory; and
a set of computer instructions contained in the memory, the set of computer instructions including computer instructions which when executed by the one or more processors, cause the one or more processors to:
upon notification of an update operation to an object store, lock a plurality of caches to prevent subsequent write operations; and
update the plurality of caches as a common transaction.

33. The system of claim 32, wherein the locking includes concurrently locking the plurality of caches upon notification of the update operation to the object store.

34. The system of claim 32, wherein a set of computer instructions cause the one or more processors to register an interest by each of the plurality of caches in at least one object stored within the object store.

35. The system of claim 34 wherein the interest of at least one cache of the plurality of caches is registered in an object type.

36. The system of claim 34 wherein the interest of at least one cache of the plurality of caches is registered in a specific object.

37. The system of claim 32, wherein a set of computer instructions cause the one or more processors to instantiate a notification thread responsive to the notification of the update operation, the notification thread operating to lock the plurality of caches to prevent the subsequent write operations to the plurality of caches.

38. A machine-readable medium embodying a sequence of instructions that, when executed by a machine, cause the machine to:
upon notification of an update operation to an object store, identify a plurality of caches to be notified of the update;
lock the plurality of caches to prevent subsequent write operations to the plurality of caches; and
update the plurality of caches as a common transaction.

39. The machine-readable medium of claim 38 wherein the identifying includes dynamically generating a map identifying the plurality of caches as having registered an interest in the update operation, the map further identifying objects in the object store that are affected by the update operation.

40. The machine-readable medium of claim 39, wherein the identifying further includes identifying a plurality of objects that are of interest to at least one cache in the plurality of caches.

41. The machine-readable medium of claim 39, wherein the interest in the update operation can be registered by an object type or an object ID.

42. The machine-readable medium of claim 41, wherein updating includes:
initializing the objects to be added/updated/removed; and
copying the transient attributes from the associated cached objects.

43. The machine-readable medium of claim 38 wherein the locking includes concurrently locking the plurality of caches upon notification of the update operation to the object store.

44. A system to maintain cached objects, the system comprising:
means for identifying a plurality of caches to be notified of an update operation to an object store;
means for concurrently locking the plurality of caches to prevent subsequent write operations to the plurality of caches; and
means for updating the plurality of caches as a common transaction.

45. The system of claim 44 including means for registering an interest by each of the plurality of caches in at least one object stored within the object store.

46. The system of claim 44 including means for transactionally updating a plurality of objects in the object store.

* * * * *